April 8, 1969  M. W. SHEETS  3,436,815
ENCAPSULATION PROCESS FOR RANDOM WOUND COILS
Filed Sept. 22, 1966

INVENTOR.
MARVIN W. SHEETS
BY James C. Davis Jr.
HIS ATTORNEY

United States Patent Office 3,436,815
Patented Apr. 8, 1969

3,436,815
ENCAPSULATION PROCESS FOR RANDOM WOUND COILS
Marvin W. Sheets, Saratoga, Calif., assignor to General Electric Company, a corporation of New York
Filed Sept. 22, 1966, Ser. No. 581,366
Int. Cl. H02k 15/12; H01b 7/00
U.S. Cl. 29—605
6 Claims The present invention pertains to processes for making dynamoelectric machine stators and, more specifically, relates to means for insulating and supporting random wound coils.

The two basic kinds of stator coils, from the structural viewpoint, are the form wound coil and random wound coil. The form wound coil is typically made in the configuration which it will have in the finished product and for this reason it can be equipped with a relatively rigid and complete insulation system prior to insertion in the core slots. The random wound coil, on the other hand, is fabricated of a relatively large number of turns of insulated magnet wire and must be sufficiently flexible to permit forming during and after insertion into the core slots. The present invention is addressed to the problem of providing rigid coil insulation for random wound coils after insertion into the core slots.

It has been known, heretofore, to encapsulate the end turns of stators after insertion of random wound coils or to vacuum impregnate a random wound stator with a thermosettable resinous material. A recognized disadvantage of encapsulation is that the desirable end turn ventilation passageways between coils are filled, resulting in a motor that must be derated, or operated at reduced power levels to avoid overheating. Impregnation processes using thick, syrupy resinous materials yield a result not unlike that in the case of encapsulation, while the use of thinner materials fails to provide the necessary protection required in many applications, for example, in submersible pump motors. Further disadvantages sometimes noted in prior random wound stators of encapsulated construction include cracking of the insulation in the slots, probably attributable to the complete filling of the slot and the differences in thermal expansion between iron or steel and cured resin.

Accordingly, a principal object of this invention is to provide an improved stator having random wound coils.

Another object of this invention is to provide rigid coil insulation, in a random wound stator, while preserving end turn cooling passages between the coils.

Briefly, I have discovered that by completely wrapping random wound coils with a permeable tape and thereafter vacuum-impregnating the wound stator with a highly filled resin, a rigid, void-free coil insulation is provided. By selecting the size of the pores in the permeable tape to be small relative to the particle size of the filler, the impregnant can be drained from the stator leaving behind the coil impregnant retained in place by the tape. In this way, individual coils are essentially encapsulated without providing a totally encapsulated winding structure. Thus, random wound stators in accord with this invention enjoy advantages heretofore reserved for form wound stators.

While the specification concludes with claims particularly pointing out and distinctly claiming the subject matter which I regard as my invention, it is believed the invention will be better understood from the following description taken in connection with the accompanying drawings in which:

Figure 1:
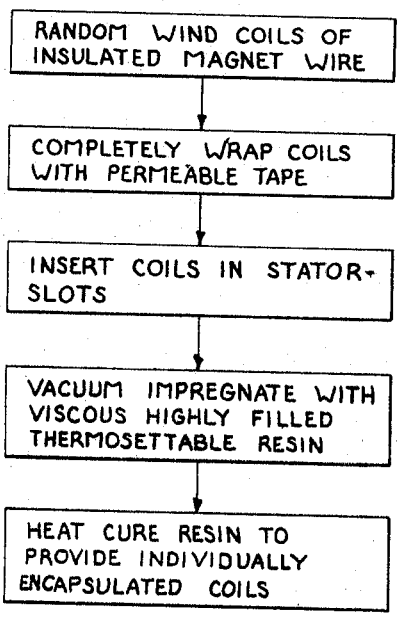
FIGURE 1 illustrates a process flow chart indicating sequential steps in accord with an embodiment of the invention.
Figure 2:
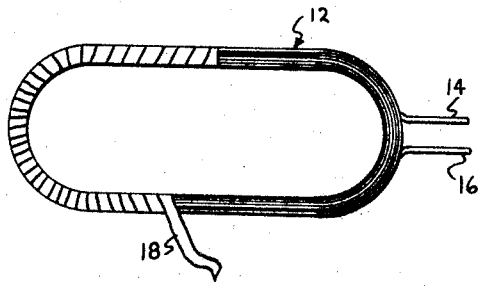
FIGURE 2 shows a random wound coil partially taped.

In a typical application relating to the invention, there are provided a plurality of random wound coils of insulated magnet wire, as coil 12 in FIGURE 2, by any of a plurality of well-known means. The coil has a pair of connection leads 14 and 16, which are commonly the respective ends of the coil, available for suitable connections after the coil is inserted in the motor core. Sometimes partial connections are made in corresponding groups of coils prior to insertion in the core. The magnet wire is usually of round cross section and oftentimes is fabricated from copper or copper alloys, although aluminum is also used to a more limited extent. Magnet wire insulation is customarily provided in the form of a thin film of varnish, epoxy resin, or the like.

Coil 12 is completely wrapped with a permeable, or porous, tape 18 as shown partially completed in FIGURE 2. By completely wrapped, it is meant that not only the coil sides, which are destined for insertion in the core slots, but also the end turns of the coil 12 are wrapped. The coil leads 14 and 16 are not wrapped.

Figure 3:
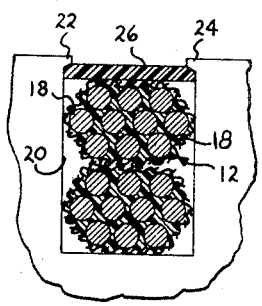
FIGURE 3 is a cutaway view of a motor stator showing one slot having a motor winding therein.

After each of the motor coils has been wrapped completely as above, they are inserted in the slots of a motor stator and connected in any of the customary winding configurations. FIGURE 3 depicts one of the many coil-receiving slots 20 which usually extend axially and are circumferentially spaced about a rotor-receiving bore through the stator core. Random wound coils have heretofore been positioned in substantially closed slots, that is to say, the slot opening into the bore was considerably narrowed relative to the remainder of the slot width. Open slots, of the kind shown, are preferred in accord with the present invention to receive more easily the wrapped coil sides without abrading the wrapping. Lip portions, as at 22 and 24, can be provided advantageously to restrain a slot wedge 26. Alternatively, the slot walls adjacent the opening into the bore can be grooved for this purpose. Two coil sides per slot are illustrated, although one or more than two coil sides per slot can be used.

The end turns are thereafter formed in conventional manner and secured in place, as by tying with resin-impregnated, oriented glass roving, for example. A non-essential, but highly desirable, next step in the manufacture involves preheating the wound core to remove any moisture present and to shrink the coil wrapping. Heating to a temperature of approximately 300° F. for about 2½ hours is satisfactory for the purposes, although wide deviations in temperature and time are permissible, particularly depending upon the quantity of moisture present.

A wound stator is then vacuum-impregnated. A vacuum of 29.5 inches of mercury or more is preferred. Epoxy or polyester resins, for example, is introduced into the evacuated enclosure and completely immerses the stator. Alternatively, the epoxy resin can be always in the enclosure and the stator lowered to effect submersion therein. In a typical case, the stator is completely submerged for approximately 15 minutes or more, drained at atmospheric pressure for 5 minutes or more, depending to some extent upon the viscosity of the resin, and then baked. The vacuum-impregnation step can be repeated one or more times. The resulting stator includes random wound coils having individual encapsulation, as with form wound coils, and includes ventilation passages between individual coils within the end turn region.

To achieve the advantageous objectives of the invention, the resin employed must be highly filled (preferably more than 50 percent) so that openings in the weave of the coil wrapping are sufficiently blocked to retain resin in the coil structure, while the resin is drained from other portions of the stator. Of course, it is not practical to quickly coat the coils with a rapidly drying material, as has been suggested with individual form wound coils, because major portions of the coils are not accessible in apparatus manufactured in accord with the present invention, but are disposed deep within the slots and covered by wedge 26.

The presently preferred material for tape 18 comprises ethylene glycol terephthalate fibers woven into an open weave permeable fabric and providing a ¾ inch wide tape having a thickness of approximately .003 inch. A wrapping of this kind, in addition to being chemically clean and easy to apply, possesses the useful properties of shrinking when heated, thereby compressing coil 12 into a more dense mass, and decreasing in permeability.

Tape of appropriate permeability for the particular highly filled resin selected is advantageously determined in the general case by taping a group of insulated magnet wire conductors with tapes of varying numbers of threads per inch to provide a plurality of samples. The samples are bent into U shapes and the bites thereof are submerged in the resin in a vacuum tank evacuated to 29.5 inches of mercury or more for approximately 5 minutes. The samples are then left in the resin at atmospheric pressure for an additional 5 minutes and thereafter removed, drained, and baked to cure with the open ends upward. After cooling, the samples are submerged in water containing a wetting agent for 10 minutes. At the end of this time, while still submerged, those samples exhibiting a resistance, from the conductors to the water, in excess of 500 million ohms have been found to be wrapped with tape of suitable permeability to permit vacuum impregnation of the coil while preventing egress of the particular resin during the drain cycle. The tape is more conveniently matched to the resin than vice versa because the freedom of selection of appropriately woven tape is less restricted in the usual case.

In a presently preferred example of practice of the present invention, there is provided an alternating-current induction motor stator 2¾ inches long with an outside diameter of 10½ inches and an inside diameter of 6⅞ inches. The stator is equipped with open slots with .020 inch lip portions for engaging slot wedges. The winding comprises random wound coils of insulated copper magnet wire and the coils are completely wrapped with a ½ lap of chemically clean, shrinkable, ¾ inch wide, .003 inch thick, ethylene glycol terephthalate fiber tape in an open weave of .0015 inch nominal diameter fibers with 60 transverse strands per inch and the equivalent of 80 longitudinal strands per inch. After insertion, connection and forming of the coils in the stator, the stator is preheated to 300° F. for 2½ hours to remove any moisture present. While at the temperature of 300° F., the stator is thereafter sealed in a vacuum tank evacuated to 29.5 inches of mercury. The tank contains a catalyzed, filled thermosettable epoxy resin, having a viscosity of 27,000 cps. at 77° F., and a specific gravity of 1.2, obtained from The Epoxylite Corporation and designated in the industry as #108. The stator is positioned above the surface of the resin for 10 minutes and then submersed in the resin for 10 minutes. The tank is then opened to the atmosphere and submersion of the stator continued for 10 additional minutes. The stator is thereafter permitted to drain for 5 minutes in the atmosphere and is then removed to an oven where it is baked for 3 hours at 300° F. The vacuum impregnation process is repeated once again as before and final cure is effected by baking at 300° F. for 6 hours.

The stator processed in accord with this invention as described above has individually encapsulated random wound coils without resin build-up between coils in the end turn region or filling of the slots around the coils in the slots. The winding resistance to ground exceeds 500 million ohms after submergence in a tank of water containing a wetting agent (liquid Tergitral non-ionic NPX) for 10 minutes. The stator is assembled into a complete motor and subjected for one week to an environment of 100% humidity with dew (power off) and one week of continuous reversing duty at rated temperature including a salt-water spray application. At the end of this humidity-vibration test, the winding withstands 150% rated voltage for more than one minute. The motor is subjected to four additional similar humidity-vibration test cycles without failure.

Thus, it may be seen that practice of the present invention provides a random wound machine which has the desirable performance characteristics of form wound machines. This is achieved by the individual coil encapsulation achieved after winding of the stator, in accord with the present teaching.

The process of this invention is particularly advantageous when practiced with resins characterized by relatively low viscosity immediately preceding curing or congealing. Thus, the epoxy resins having this characteristic are presently preferred materals. With these materials the resin enters the coil through the tape when the vacuum tank is vented to the atmosphere and the filler, as talc or silica glass, for example, is left behind filling the interstices of the tape. Then, during the bake cycle and immediately prior to congealing, essentially all of the resin drains from the stator except that which is retained or trapped in the individual coils by the tape, which has become less permeable and serves as a barrier to egression.

The foregoing is a description of an illustrative embodiment of the invention, and it is applicant's intention in the appended claims to cover all forms which fall within the scope of the invention.

What I claim as new and desire to secure by Letters Patent of the United States is:

1. The process of fabricating a dynamoelectric machine stator comprising:
   (a) providing a stator core having a rotor-receiving bore therein and a plurality of axially extending open slots in said core circumferentially spaced about said bore;
   (b) random winding a plurality of coils of insulated magnet wire;
   (c) completely wrapping said coils with porous insulating tape;
   (d) positioning said coils in corresponding ones of said slots and making suitable connections to constitute a motor winding;
   (e) preheating the wound stator core to expel moisture therefrom;
   (f) vacuum-impregnating said wound stator core with a viscous thermosettable resin having a filler therein and concomitantly filling the pores in said porous tape with the filler in said resin; and
   (g) heating said wound stator core to set said resin and concomitantly retaining resin inside said individual coils by means of said tape while draining substantially all of the remainder of said resin from said wound stator core.

2. The process of claim 1 wherein said resin is characterized by a relatively high viscosity immediately preceding setting thereof.

3. The process of claim 1 wherein said tape is an open weave of ethylene glycol terephthalate fibers that is heat shrinkable.

4. The process of claim 1 wherein the particle size of said filler is larger than the pores in said tape.

5. The process of claim 1 wherein said tape is approximately .003 inch in thickness and is constituted of woven fibers spaced in the range of from approximately 60 to 80 fibers per lineal inch.

6. The process of claim 1 wherein said slots are open and said coils are positioned and secured therein by means of slot wedges.

References Cited

UNITED STATES PATENTS

| | | | |
|---|---|---|---|
| 2,656,290 | 10/1953 | Berberich et al. | 310—45 X |
| 2,774,900 | 12/1956 | Acton et al. | 310—260 X |
| 3,079,519 | 2/1963 | Kitson et al. | 310—45 X |

JOHN F. CAMPBELL, *Primary Examiner.*

C. E. HALL, *Assistant Examiner.*

U.S. Cl. X.R.

29—596; 174—120; 310—45